(12) United States Patent
Yang

(10) Patent No.: US 12,410,373 B1
(45) Date of Patent: Sep. 9, 2025

(54) BIOMASS FUEL PROCESSING PELLET MILLS AND CONTROL METHODS THEREOF

(71) Applicant: CHANGZHOU UNIVERSITY, Jiangsu (CN)

(72) Inventor: Yantao Yang, Changzhou (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 0 days.

(21) Appl. No.: 19/187,971

(22) Filed: Apr. 23, 2025

Related U.S. Application Data

(63) Continuation-in-part of application No. PCT/CN2024/105110, filed on Jul. 12, 2024.

(30) Foreign Application Priority Data

Jul. 5, 2024 (CN) .......................... 202410899398.0

(51) Int. Cl.
- C10L 5/34 (2006.01)
- C10L 5/36 (2006.01)
- C10L 5/44 (2006.01)

(52) U.S. Cl.
CPC .............. C10L 5/363 (2013.01); C10L 5/442 (2013.01); *C10L 2200/0469* (2013.01); *C10L 2290/30* (2013.01); *C10L 2290/58* (2013.01)

(58) Field of Classification Search
CPC .. C10L 5/363; C10L 5/442; C10L 2200/0469; C10L 2290/30; C10L 2290/58
See application file for complete search history.

(56) References Cited

FOREIGN PATENT DOCUMENTS

| CN | 102614812 A | 8/2012 |
| CN | 103566826 A | 2/2014 |

(Continued)

OTHER PUBLICATIONS

CN106635233A English Translation (Year: 2017).*

(Continued)

*Primary Examiner* — Ellen M McAvoy
*Assistant Examiner* — Chantel Graham
(74) *Attorney, Agent, or Firm* — PORUS IP LLC

(57) ABSTRACT

A biomass fuel processing pellet mill and a control method thereof are provided. The pellet mill includes a conditioner, a conveyor, and a pressing unit connected in series. The pressing unit includes a pressing housing, a ring die, a roller assembly, and an adjustment component. The adjustment component is connected to the roller assembly. The roller assembly includes a roller body and shift lever components. By setting the shift lever components, it can utilize the shift lever components to agitate the material between the ring die and the roller in the process of rotating a roller driven by the ring die, so as to improve the fluidity of the material between the ring die and the roller, and to reduce or avoid the flow of the material within the deformation-compression zone to the direction of a feeding zone when it is subjected to high-pressure extrusion, thereby improving granulation efficiency and reduce energy consumption. The control method includes: calculating a duration of the shift lever in a deformation-compression zone and a duration of the shift lever retracting into the roller body based on an inner diameter of the ring die, a diameter of the roller body, a gap between the ring die and the roller body, and a real-time angular velocity of the roller body.

12 Claims, 9 Drawing Sheets

(56) References Cited

FOREIGN PATENT DOCUMENTS

| | | | |
|---|---|---|---|
| CN | 106635233 A | * | 5/2017 |
| CN | 208482401 U | | 2/2019 |
| CN | 110314614 A | | 10/2019 |
| CN | 115779788 A | | 3/2023 |
| CN | 117884037 A | | 4/2024 |
| CN | 117920046 A | | 4/2024 |
| CN | 119193212 A | | 12/2024 |

OTHER PUBLICATIONS

International Search Report in PCT/CN2024/105110 mailed on Feb. 25, 2025, 8 pages.
Written Opinion in PCT/CN2024/105110 mailed Feb. 25, 2025, 2019, 9 pages.

* cited by examiner

900

910 acquiring an inner diameter of the ring die and a diameter of the roller body 920 acquiring a gap between the ring die and the roller body 930 acquiring a real-time angular velocity of the roller body 940 calculating a duration of the shift lever in a deformation-compression zone and a duration of the shift lever retracting into the roller body based on the inner diameter of the ring die, the diameter of the roller body, the gap, and the real-time angular velocity

FIG. 9

BIOMASS FUEL PROCESSING PELLET MILLS AND CONTROL METHODS THEREOF

CROSS-REFERENCE TO RELATED APPLICATIONS

This application is a continuation-in-part application of International Application No. PCT/CN2024/105110, filed Jul. 12, 2024, which claims priority to Chinese Patent Application No. 202410899398.0, filed on Jul. 5, 2024, the entire contents of each of which are incorporated herein by reference.

TECHNICAL FIELD

The present disclosure relates to the technical field of biomass processing and molding equipment, and specifically relates to a biomass fuel processing pellet mill and a control method thereof.

BACKGROUND

Biomass molding is the process of molding powdered biomass and liquid raw materials through mechanical compression and polymerization after water and heat conditioning. Currently, biomass may be molded and processed by pelletizers.

In the pelletizing process of a ring die pelletizer, the pelletizing chamber achieves mechanically forced extrusion feeding through high-speed rotary centrifugal distribution. Powdered material is extruded between the rotating ring die and the pressure rollers and is subsequently extruded out of the die holes to form pellets. In the initial stage, the material temperature as it enters the die holes is the same as that in the extrusion molding zone. However, as the extrusion process proceeds, frictional heat is generated by the frictional action between the material and the walls of the die holes, which results in the temperature of the center of the material being lower than the temperature of the sides. When the material is extruded out of the ring die hole, its center temperature has reached the critical point of lignin softening, and the temperature of the outer side of the material is significantly higher than the softening temperature of lignin due to the frictional heat generated by the friction between the material and the wall of the die hole. This temperature gradient leads to the carbonization of part of the material in the ring die hole, and at the same time, there is a difference in moisture content between the inside and outside of the pellets, which triggers the phenomenon of "popping". This phenomenon is manifested as the fracture or cracking of the molded pellets, which seriously affects the molding quality of the pellets.

SUMMARY

One or more embodiments of the present disclosure provide a biomass fuel processing pellet mill. The biomass fuel processing pellet mill comprises: a conditioner, a conveyor, and a pressing unit connected in series; wherein the pressing unit includes a pressing housing, a ring die, a roller assembly, and an adjustment component; wherein the ring die is disposed within the pressing housing; the roller assembly is arranged inside the ring die, and the roller assembly and the ring die form an extrusion gap; the roller assembly includes a roller body and shift lever components, wherein the shift lever components are located inside the roller body and capable of extending outward from or retracting into the roller body; and the adjustment component is connected to the roller assembly and configured to adjust the extrusion gap between the roller assembly and the ring die.

One or more embodiments of the present disclosure provide a control method for the biomass fuel processing pellet mill. The control method comprises: acquiring an inner diameter of the ring die and a diameter of the roller body; acquiring a gap between the ring die and the roller body; acquiring a real-time angular velocity of the roller body; and calculating a duration of the shift lever in a deformation-compression zone and a duration of the shift lever retracting into the roller body based on the inner diameter of the ring die, the diameter of the roller body, the gap, and the real-time angular velocity.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein:

FIG. 9 is a flowchart illustrating a process of a control method for a biomass fuel processing pellet mill according to some embodiments.

The meanings of symbols in the figures are as following: 100 is a conditioner, 200 is a conveyor, 300 is a pressing unit, 1 is a pressing housing, 2 is a ring die, 3 is a roller assembly, 31 is a roller body, 32 is a shift lever component, 321 is a cage, 322 is a first driving unit, 3221 is a driving disk, 3222 is a first driving gear, 3223 is a driving rod, 323 is a shift lever, 3231 is a helical groove, 33 is a limit disk, 331 is a limit slot, 34 is a support frame, 341 is a guide slot, 4 is a second driving unit, 41 is a driving box, 42 is a second driving gear, 43 is a driven gear, 5 is a limit block, 6 is an adjustment component, 61 is a actuator, 62 is a slider, A is an extrusion molding zone, B is a deformation-compression zone, and D is a feeding zone.

DETAILED DESCRIPTION

The accompanying drawings, which are required to be used in the description of the embodiments, are briefly described below. The accompanying drawings do not represent the entirety of the embodiments.

As shown in the present disclosure and the claims, unless the context clearly suggests an exception, the words "a", "an", "one", "and/or "the" do not refer specifically to the singular, but may also include the plural. Generally, the terms "including" and "comprising" only suggest the inclusion of explicitly identified steps and elements that do not constitute an exclusive list, and the method or devices may also include other steps or elements.

It should be understood that, for the purpose of describing the present disclosure, the terms "center", "upper surface", "lower surface", "top", "bottom", "inner", "outer", "axial", "radial", "peripheral", "external", or the like indicate positional relationships based on those shown in the accompanying drawings, rather than indicating that the device, assembly, or unit referred to must have a particular positional relationship, and are not to be construed as a limitation of the present disclosure. However, the words may be replaced by other expressions if other words may accomplish the same purpose.

Figure 1:
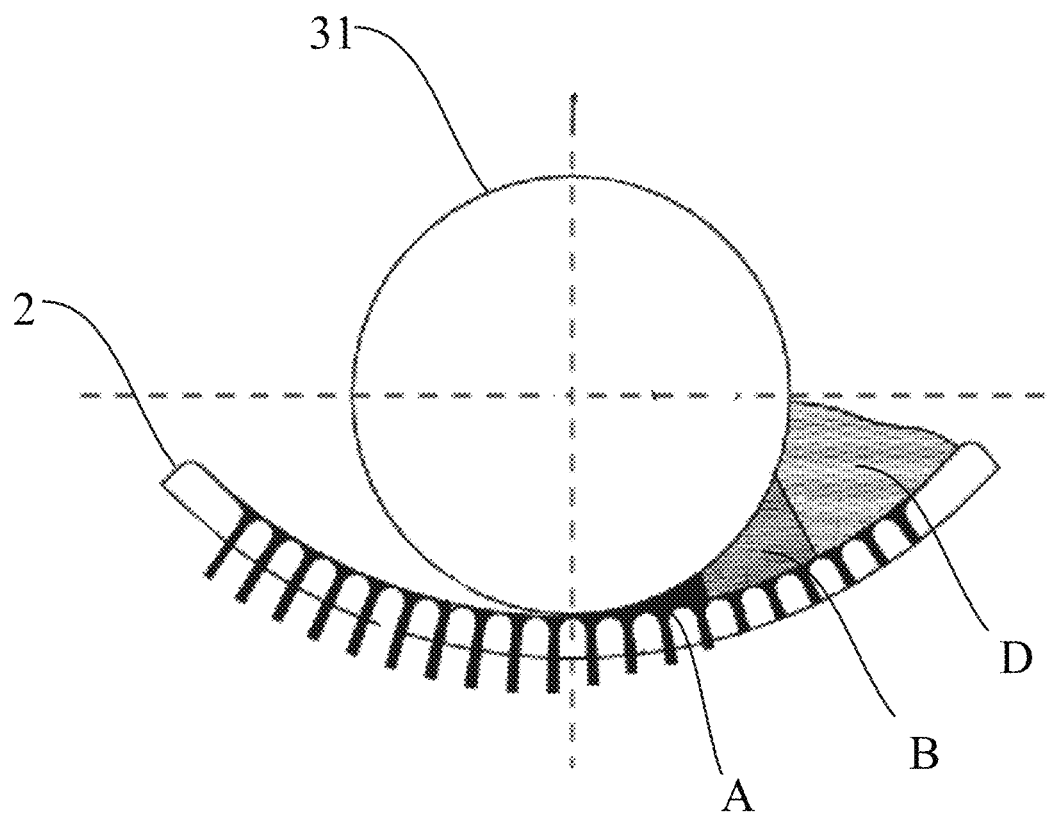
FIG. 1 is a schematic diagram of a ring die pelletizing and molding mechanism according to some embodiments of the present disclosure.
Figure 2:
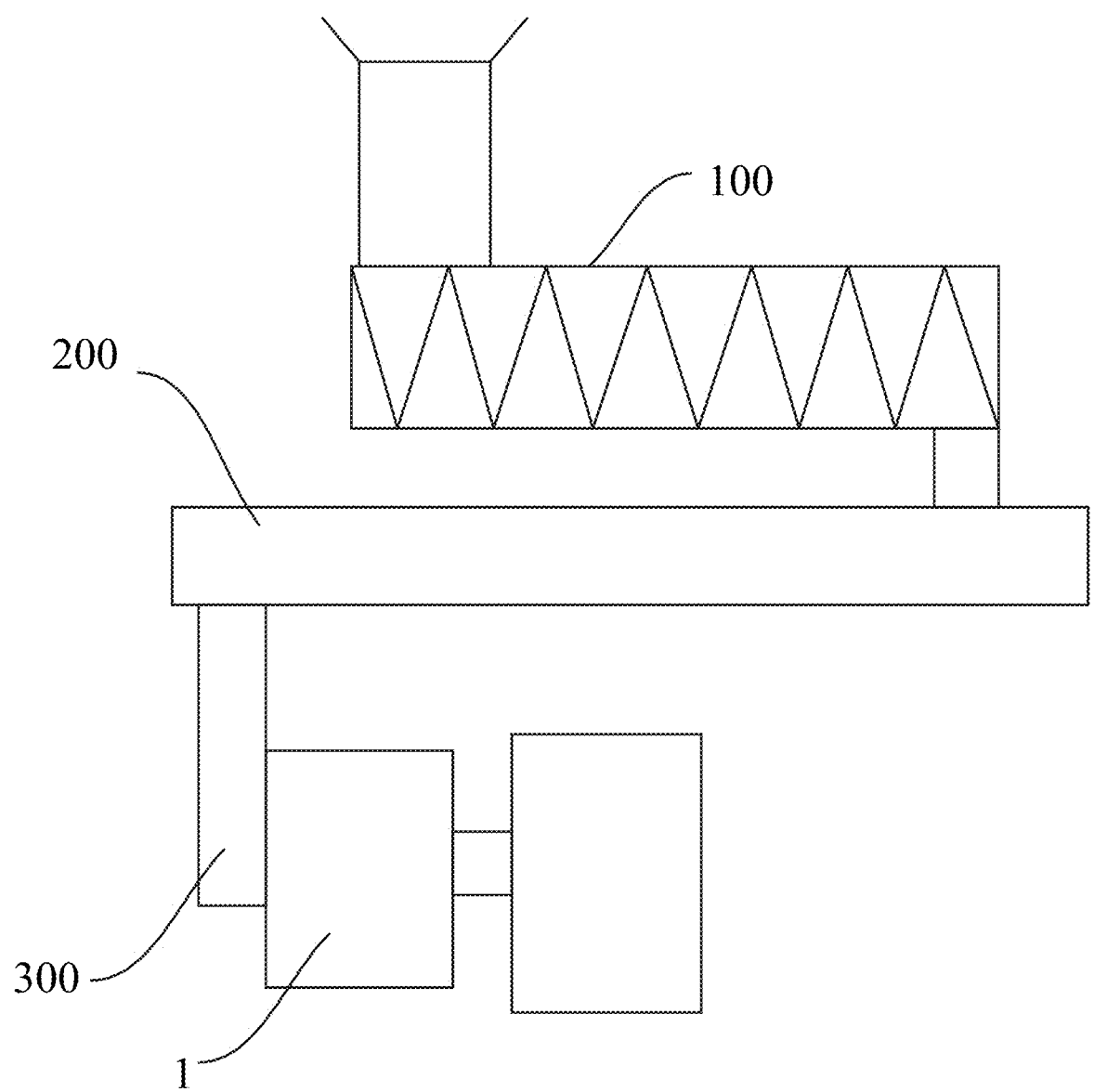
FIG. 2 is a schematic diagram of a structure of a biomass fuel processing pellet mill according to some embodiments of the present disclosure.

FIG. 1 is a schematic diagram of a ring die pelletizing and molding mechanism according to some embodiments of the present disclosure. FIG. 2 is a schematic diagram of a structure of a biomass fuel processing pellet mill according to some embodiments of the present disclosure.

In some embodiments, as shown in FIG. 2, a biomass fuel processing pellet mill comprises: a conditioner 100, a conveyor 200, and a pressing unit 300 connected in series.

A biomass fuel, referred to as a material, is fuel produced through processing of a biomass feedstock (e.g., wood, crop straw, forestry waste, energy crops, etc.).

The biomass fuel processing pellet mill is equipment for processing (compressing) loose biomass feedstock into high-density granular biomass fuel.

The conditioner 100 is a pretreatment core unit of the biomass fuel processing pellet mill. For example, the conditioner 100 may include a steam conditioner, a heating conditioner, and a mixing conditioner for humidity regulation, temperature elevation, and mixing homogenization, respectively. The biomass feedstock forms a homogeneous viscous-plastic material in the conditioner 100 after being pre-treated by the humidity adjustment, temperature adjustment, and mixing to meet a requirement of a subsequent pressing process.

The conveyor 200 is a material transfer channel connecting the conditioner 100 to the pressing unit 300 for stably conveying the biomass feedstock pre-treated by the conditioner 100 to the pressing unit 300. For example, the conveyor 200 may be a belt conveyor, a screw conveyor, or a pneumatic conveying system, etc.

The pressing unit 300 is a unit that compresses the pre-treated biomass feedstock.

Figure 3:
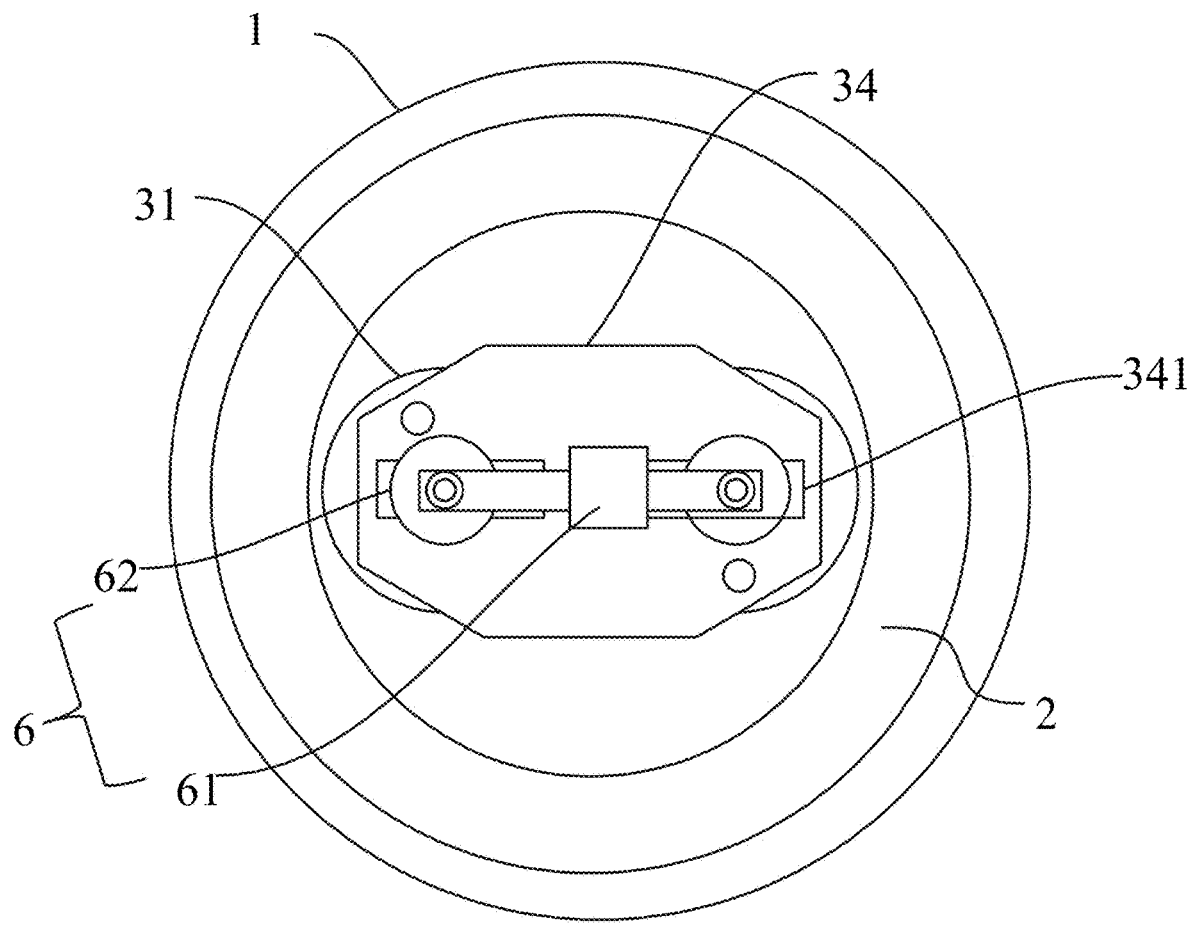
FIG. 3 is a schematic diagram of the structure of a pressing unit according to some embodiments of the present disclosure.

FIG. 3 is a schematic diagram of a structure of a pressing unit 300 according to some embodiments of the present disclosure.

In some embodiments, as shown in FIG. 3, the pressing unit 300 includes a pressing housing 1, a ring die 2, a roller assembly 3, and an adjustment component 6. The ring die 2 is disposed in the pressing housing 1, the roller assembly 3 is disposed in the ring die 2, the roller assembly 3 forms an extrusion gap with the ring die 2, and the adjustment component 6 is connected to the roller assembly 3.

The pressing housing 1 is an outer housing structure of the pressing unit 300 for housing and protecting the ring die 2, the roller assembly 3, and other components inside the pressing housing 1.

The ring die 2 is a ring-shaped die, as shown in FIG. 1, and the ring die 2 has a plurality of holes (i.e., die holes) along its circumferential direction. The pre-treated biomass feedstock is extruded into granular material (referred to as pellets) through the die holes after the pressing unit 300 completes the pressing.

Figure 4:
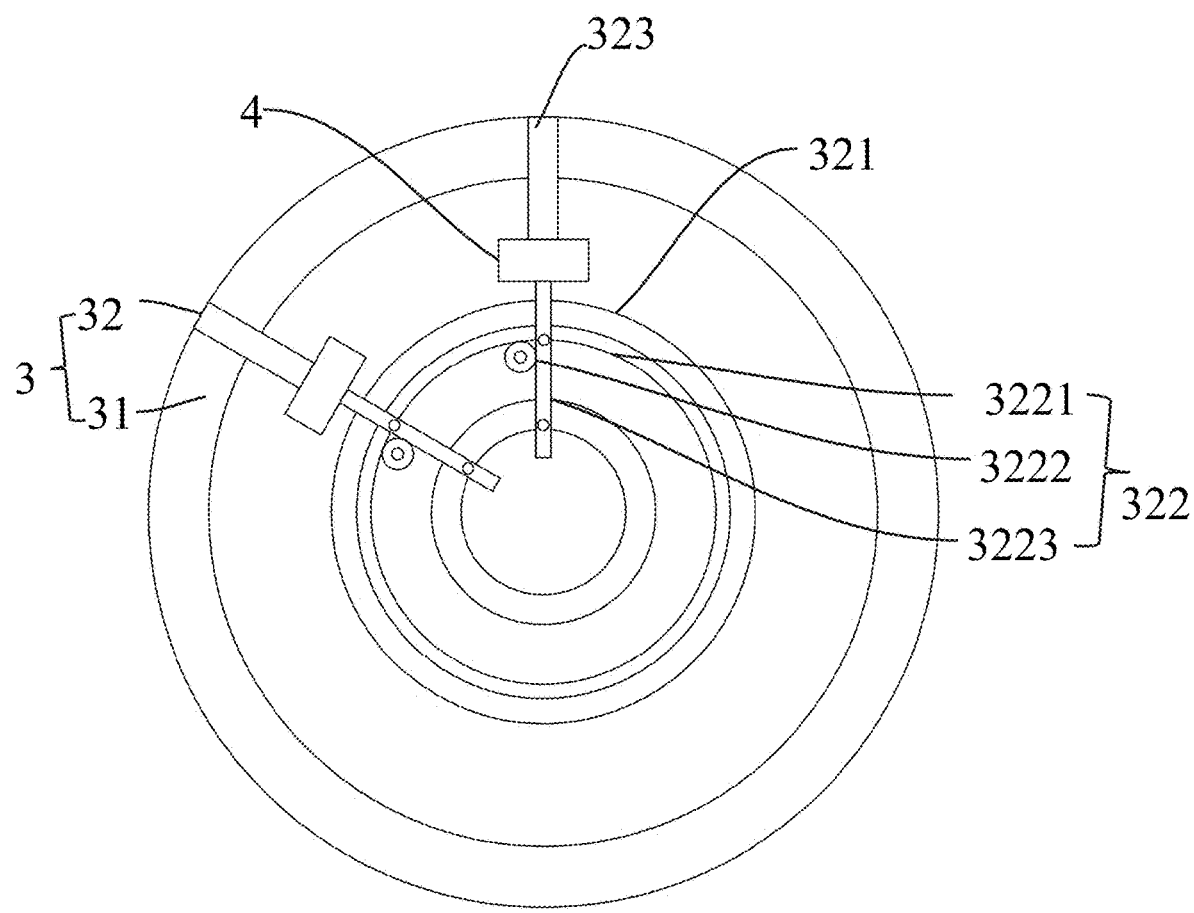
FIG. 4 is a schematic diagram of the structure of a roller assembly according to some embodiments of the present disclosure.

The roller assembly 3 is a rotating component located inside the ring die 2 for pressing the pre-treated biomass feedstock to form a material. FIG. 4 is a schematic diagram of the structure of the roller assembly 3 according to some embodiments of the present disclosure. As shown in FIG. 4, the roller assembly 3 includes a roller body 31 and a shift lever component 32, and the shift lever component 32 is located inside the roller body 31 and capable of extending outward from or retracting into the roller body 31.

In some embodiments, the shift lever component 32 periodically extends to agitate the material as the ring die 2 rotates, and an extension duration and a retraction duration of the shift lever component 32 may be controlled in real time based on an inner diameter of the ring die, a diameter of the roller body, a gap between the ring die and the roller body, and a real-time angular velocity of the roller body. A description of this part may be found in FIG. 9.

The adjustment component 6 is connected to the roller assembly 3 for adjusting the extrusion gap between the roller assembly 3 and the ring die 2, i.e., the gap between the roller body 31 and the ring die 2. For more on the roller assembly 3 and the adjustment component 6, please see the related description below.

A spacing distance between the roller assembly 3 and the ring die 2 may be adjusted by setting the adjustment component 6. When the spacing distance increases, a pressure of the roller assembly 3 and the ring die 2 on the material decreases, so that the pressure on the material after entering the die holes and a friction between the material and the die holes are reduced, thereby reducing a risk of uneven moisture content due to frictional heat between an outside of the material and an inner wall of the die holes. The spacing distance between the roller assembly 3 and the ring die 2 needs to be adjusted within a certain range. When the spacing distance is too large, it may also lead to insufficient pressure so that the material failure to be molded. Therefore, the technical problem solved in the present disclosure is how to reduce the risk of uneven moisture content due to frictional heat between the outer side of the material and the inner walls of the die holes under the premise of molding.

In conjunction with FIG. 1 to FIG. 3, in the biomass fuel processing pellet mill, the conditioner 100, the conveyor 200, and the pressing unit 300 are sequentially connected in series. The conditioner 100 first pre-treats the biomass feedstock, and then conveys the pre-treated biomass feedstock via the conveyor 200 to the pressing unit 300 to enter a feeding zone D. The pressing unit 300 includes the pressing unit 1, the ring die 2, the roller assembly 3, and the adjustment component 6. The extrusion gap between the roller assembly 3 and the ring die 2 is adjusted through the adjustment component 6 to control the processing process, so that the pre-treated biomass feedstock passes through the feeding zone D, a deformation-compression zone B, and an extrusion molding zone A in turn, and is finally pressed into the die holes of the ring die 2 to form dense pellets, and the pelletizing process is completed.

In some embodiments, the biomass fuel processing pellet mill further includes a negative pressure fan. The negative pressure fan is mechanically connected to an interior of the pressing housing 1 via a suction pipe. The negative pressure fan is configured to generate a negative pressure driving force by extracting gas from the interior of the pressing housing 1 to drive the material after the pressing is completed to be discharged smoothly from the die holes. An operating parameter of the negative pressure fan is related to a material pellet size distribution and the extrusion gap.

The material pellet size distribution refers to a proportion of pellets with different diameters. For example, the proportion of pellets with a diameter of 3 mm is 80%, and the proportion of pellets with a diameter of 5 mm is 20%.

In some embodiments, the material pellet size distribution may be determined based on a die hole configuration of the ring die 2. The die hole configuration refers to a proportion of die holes with different diameters on the ring die. For example, if a ratio of the die holes with a diameter of 3 mm to the die holes with a diameter of 5 mm on the ring die 2 is 4:1, the material pellet size distribution of the material extruded through the ring die 2 may be 80% of pellets with a diameter of 3 mm and 20% of pellets with a diameter of 5 mm.

In some embodiments, regulation of the material pellet size distribution may be achieved by replacing the ring die 2 with different die hole configurations.

In some embodiments, the negative pressure fan draws out the internal gas of the pressing housing 1 through the suction pipe, so as to form a negative-pressure environment inside the pressing housing 1, thereby utilizing a suction force generated by a difference between an internal air pressure and an external air pressure of the pressing housing 1 to assist the material after the pressing is completed to be discharged from the die holes of the ring die 2.

The operating parameter of the negative pressure fan may include an operating power of the negative pressure fan, which correlates to the material pellet size distribution and the extrusion gap.

For example, when pellets with smaller diameters (e.g. the diameters smaller than a preset diameter) account for a larger percentage (e.g. the percentage exceeding a percentage threshold), the negative pressure fan only needs a smaller operating power to realize a smooth discharge of pellets to avoid wasting resources; conversely, when pellets with larger diameters account for a larger percentage, the operating power of the negative pressure fan may be increased to enhance an efficiency of discharge.

As another example, the extrusion gap affects an extrusion force. When the extrusion gap is small, the extrusion force is large, and the material is compressed more compactly. Thus, the operating power of the negative pressure fan may be increased to ensure that pellets may be adsorbed smoothly.

In some embodiments of the present disclosure, the negative pressure environment created by the negative pressure fan can reduce a risk of pellets clogging in the die holes. The operating power is optimized in real time by dynamically adjusting the operating parameter of the negative pressure fan, thus avoiding the waste of energy due to excessive pumping or the failure to discharge pellets due to inadequate pumping.

In some embodiments, the biomass fuel processing pellet mill further includes a cooling assembly. The cooling assembly is arranged on the outer wall of the ring die 2 for cooling the ring die 2 to avoid the excessive pellet temperature from causing carbonization and subsequent fracture or cracking. An operating parameter of the cooling assembly is dynamically adjusted based on a temperature of the ring die.

The cooling assembly may be a water cooling system, an air cooling system, or the like, which is in contact with the outer wall of the ring die 2.

The operating parameter of the cooling assembly may include a cooling power, a cooling time, or the like, which may be dynamically adjusted based on the temperature of the ring die. For example, the cooling power may be appropriately increased as the temperature of the ring die increases, and the cooling power may be appropriately decreased when the temperature of the ring die decreases. The temperature of the ring die may be captured and acquired by a plurality of temperature sensors deployed on the inner wall of the ring die 2.

In some embodiments, the cooling assembly may operate in concert with the negative pressure fan for cooling. Based on the operating power of the negative pressure fan, a fan cooling power corresponding to the negative pressure fan is obtained through a first conversion relationship; a target cooling power required to meet a cooling demand is determined based on the temperature of the ring die through a second predetermined table; and a difference between the target cooling power and the fan cooling power is determined as the cooling power of the cooling assembly. The first conversion relationship and the second predetermined table may be derived from historical data and experimental data. The cooling demand refers to ensuring that the temperature of the pellets is reduced to a temperature at which the pellets do not carbonize.

In some embodiments of the present disclosure, by dynamically adjusting the operating parameter of the cooling assembly based on the temperature of the ring die collected by the plurality of temperature sensors deployed on the inner wall of the ring die, it can control the temperature of the ring die within a safe range, thus avoiding fracture of the pellets due to carbonization. At the same time, it can reduce the risk of uneven moisture content caused by frictional heat between the exterior of the material and the inner walls of the die holes.

In some embodiments, as shown in FIG. 3, the roller assembly 3 further includes a support frame 34. The support frame 34 is provided with a guide slot 341 extending along a radial direction of the ring die 2. The adjustment component 6 includes a slider 62 and a actuator 61; a fixed end of the actuator 61 is connected to the support frame 34, and a movable end of the actuator 61 is connected to the slider 62; the slider 62 is engaged in the guide slot 341 and movable in the guide slot 341, the slider 62 is connected to the roller body 31, and the roller body 31 is rotatable relative to the slider 62. That is, the actuator 61 drives the slider 62 to slide within the guide slot 341, and the sliding of the slider 62 drives the roller body 31 to rotate.

In some embodiments, the actuator 61 is a hydraulic cylinder or a pneumatic cylinder and has a self-locking function, the guide slot 341 extends along the radial direction of the ring die 2, the slider 62 is engaged in the guide slot 341 and the slider 62 is movable inside the guide slot 341, and using the guide slot 341 may improve a movement accuracy of the slider 62. The self-locking function may ensure stable positioning of the slider 62.

According to some embodiments of the present disclosure, by the design of the guide slot 341 extending along the radial direction of the ring die 2, it can improve the movement precision of the slider 62, while ensuring the positioning stability of the slider 62, thereby significantly improving the operation precision of the roller body 31 and the reliability of the overall structure.

In some embodiments, as shown in FIG. 4, the shift lever component 32 includes a cage 321, a first driving unit 322, and shift levers 323. The cage 321 is connected to the roller body 31 and coaxially arranged with the roller body 31; a fixed end of the first driving unit 322 is connected to the cage 321, a movable end of the first driving unit 322 is connected to the shift lever 323; and the first driving unit 322 drives the shift lever 323 to move along a radial direction of the roller body 31 so that the shift levers 323 extend outward from or retract into the roller body 31.

In some embodiments, the shift lever 323 is driven to extend outward from or retract into the roller body 31 by the first driving unit 322, allowing selective extension or retraction of the shift lever 323 during the rotation of the roller body 31, to realize a material stirring effect in different zones. For example, when clogging occurs in the feeding zone, the shift lever 323 may extend outward after the roller body 31 rotates to the feeding zone to stir the material in the feeding zone to alleviate or resolve clogging in the feeding zone.

In some embodiments of the present disclosure, by setting the shift lever component 32, the material between the ring die 2 and the roller assembly 3 can be stirred during the process of the ring die 2 driving the roller to rotate, which can not only improve a flowability of the material between the ring die 2 and the roller assembly 3, but also reduce or avoid the material within the deformation-compression zone from flowing out in the direction of the feeding zone when subjected to high pressure extrusion, thereby improving granulation efficiency and reducing energy consumption.

In some embodiments of the present disclosure, the first driving unit 322 drives the shift lever 323 to extend or retract, which is able to effectively stir the material, alleviate or solve the problem of clogging, and improve a work efficiency and reliability of the equipment, while optimizing the material handling effect.

In some embodiments, as shown in FIG. 4, the first driving unit 322 includes a driving disk 3221, a plurality of first driving gears 3222, and a plurality of driving rods 3223. The driving disk 3221 encircles around outer sides of the first driving gears 3222, the driving disk 3221 meshes with the first driving gears 3222, and the driving rods 3223 are spaced apart from the driving disk 3221 along a circumferential direction of the roller body 31, and the driving rods 3223 mesh with the first driving gears 3222, and the driving rods 3223 are movable along the radial direction of the roller body 31 to drive the shift lever 323 to extend outward from or retract into the roller body 31.

In some embodiments, the driving disk 3221 is a toothed disk, the first driving gears 3222 are gears, and the driving rods 3223 are toothed rods; the first driving gears 3222 are driven to rotate by the driving disk 3221, the first driving gears 3222 drive the driving rods 3223 to move along the radial direction of the roller body 31, and the driving rods 3223 drive the shift levers 323 to move along the radial direction of the roller body 31 to extend outward from or retract into the roller body 31.

In some embodiments, the driving disk 3221 is driven via a motor. For example, a flange is provided on a driving shaft of the motor, and the flange is connected to the driving disk 3221.

In some embodiments, a count of the first driving gears 3222 and the driving rods 3223 is a plurality, the first driving gears 3222 correspond to the driving rods 3223 one by one, and the first driving gears 3222 are circumferentially spaced around the roller body 31. For example, the count of the first driving gears 3222 and the driving rods 3223 is two; the two first driving gears 3222 correspond to the two driving rods 3223 one by one and are circumferentially spaced around the roller body 31.

In some embodiments of the present disclosure, a plurality of shift lever components 32 may be mounted by arranging the plurality of first driving gears 3222 and the plurality of driving rods 3223, and the plurality of shift lever components 32 can enhance the stirring effect and block the outflow of material from the deformation-compression zone towards the feeding zone, thereby increasing the granulation efficiency. Through a design of an engagement of the driving disk 3221 with the driving gear, the extension or retraction of the shift lever 323 can be precisely controlled, which improves an operational efficiency and reliability of the equipment.

Figure 5:
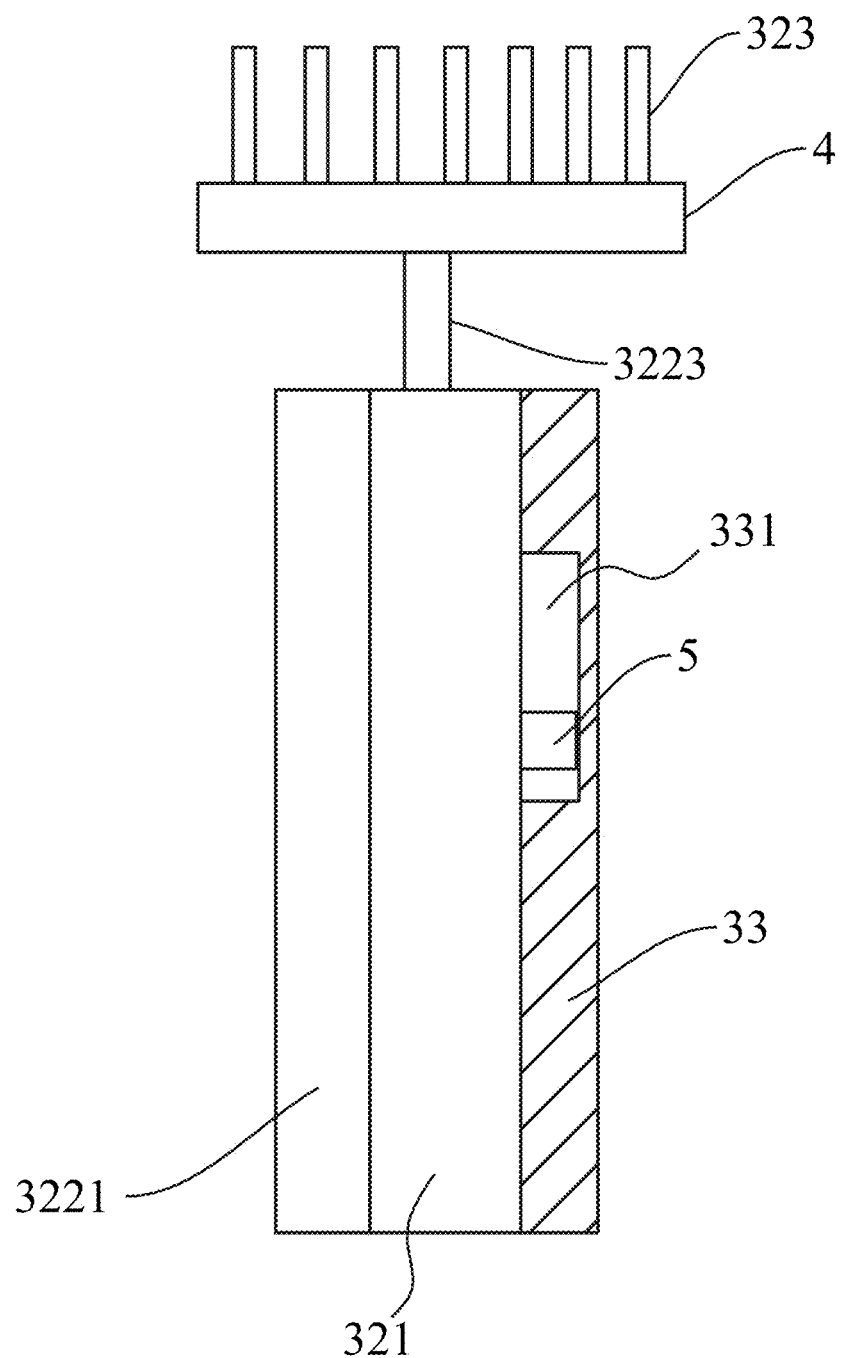
FIG. 5 is a side view of a first driving unit according to some embodiments of the present disclosure.
Figure 6:
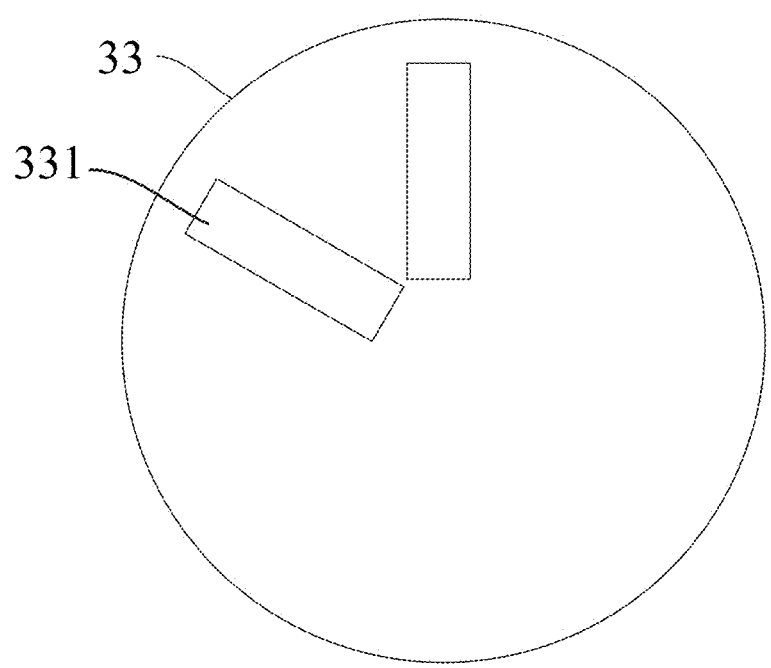
FIG. 6 is a schematic diagram of the structure of a limit disk according to some embodiments of the present disclosure.

FIG. 5 is a side view of a first driving unit according to some embodiments of the present disclosure. FIG. 6 is a schematic diagram of the structure of a limit disk according to some embodiments of the present disclosure.

In some embodiments, as shown in FIG. 5 and FIG. 6, the biomass fuel processing pellet mill further includes a limit disk 33, limit slots 331, and limit blocks 5; the limit disk 33 is arranged opposite to the driving disk 3221 in a thickness direction of the cage 321; the limit disk 33 is provided with the limit slots 331 extending along the radial direction of the roller body 31; and the driving rods 3223 are provided with the limit block 5, and the limit blocks 5 are engaged in the limit slots 331.

In some embodiments of the present disclosure, a coordinated design of the limit disk 33, the limit slots 331, and the limit blocks 5 ensures that the driving rods 3223 are moved accurately, improving the stability and reliability of the device operation.

Figure 7:
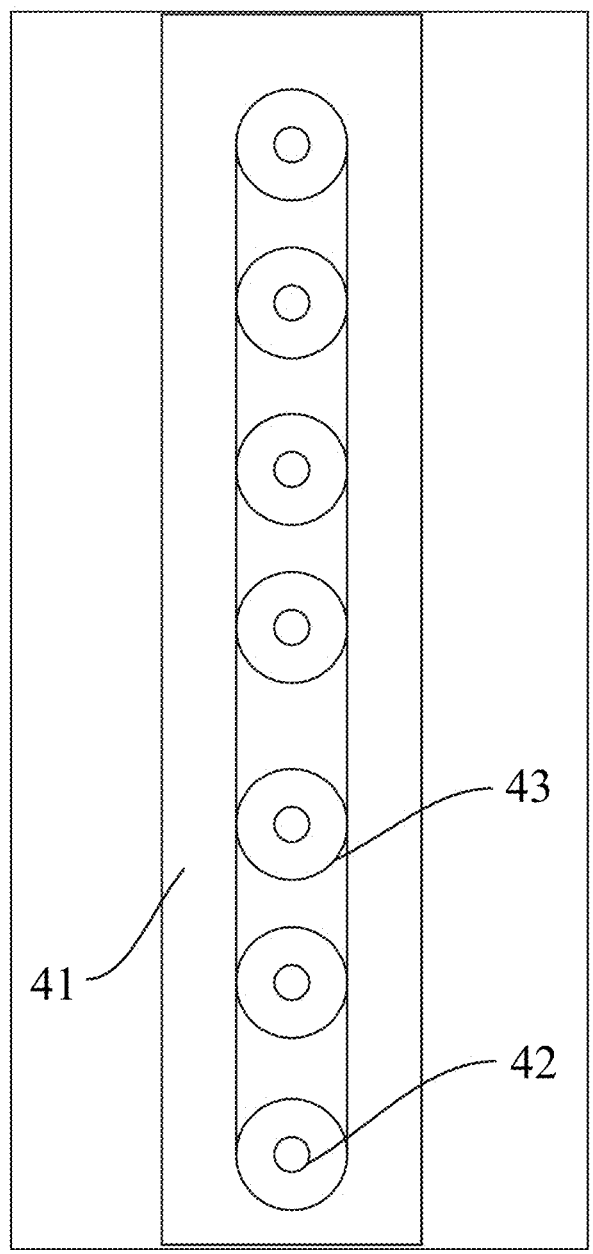
FIG. 7 is a schematic diagram of the structure of a second driving unit according to some embodiments of the present disclosure.

FIG. 7 is a schematic diagram of the structure of a second driving unit according to some embodiments of the present disclosure.

In some embodiments, as shown in FIG. 5 and FIG. 7, the biomass fuel processing pellet mill further includes second driving units 4. Each of the second driving unit 4 includes a driving box 41, a second driving gear 42, and a plurality of driven gears 43. The driving box 41 is connected to the driving rod 3223, the second driving gear 42 is located inside the driving box 41, the plurality of driven gears 43 is spaced along the axial direction of the roller body 31, the second driving gear 42 and the plurality of driven gears 43 are connected via a transmission belt. A count of the shift levers 323 is a plurality, the shift levers 323 correspond to the plurality of driven gears 43 one by one, and the plurality of driven gears 43 drive the shift levers 323 to rotate. A count of the second driving units 4 is equal to a count of the driving rods 3223, the second driving units 4 correspond the driving rods 3223 one by one, and the shift levers 323 on two adjacent driving boxes are staggered along the axial direction of the roller body 31.

In some embodiments, a plurality of shift levers 323 corresponding to one second driving unit 4 are uniformly spaced along the axial direction of the roller body 31, as shown in FIG. 5.

In some embodiments of the present disclosure, by arranging the plurality of shift levers 323 along the axial direction of the roller body 31 and staggering the shift levers 323 on the adjacent two driving boxes along the axial direction of the roller body, the shift levers 323 can cover a larger width of the deformation-compression zone, thereby improving a blocking amount and a blocking effect of the outflow of the material from the deformation-compression zone to the feeding zone, and further preventing material clogging.

In some embodiments, since an extension time, an extension frequency, and an extension length of the shift levers 323 may be controlled, for example, the extension length of the shift levers 323 may be controlled by controlling the extension length of the driving rods 3223, the extension speed of the shift levers 323 may be controlled by controlling the extension speed of the driving rods 3223, the extension frequency and the extension position of the shift levers 323 may be controlled by controlling the extension frequency of the driving rods 3223 to achieve stirring in different zones.

In some embodiments of the present disclosure, the second driving gear 42 is driven to rotate by a motor mounted within the driving box 41, which in turn drives the plurality of shift levers 323 to rotate, achieving stirring at different positions on a width of the ring die 2, thereby improving the fluidity of the material within the ring die 2, further achieving a material feeding function and enhancing the granulation effect.

Figure 8:
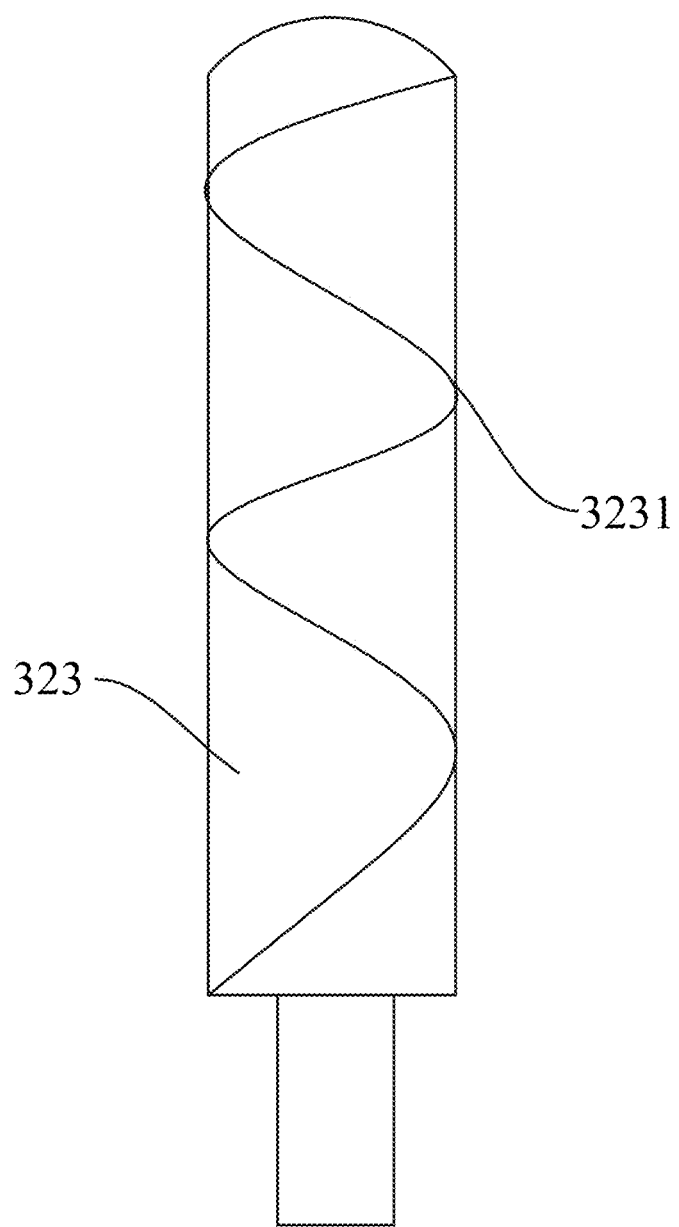
FIG. 8 is a schematic diagram of the structure of a shift lever according to some embodiments of the present disclosure.

FIG. 8 is a schematic diagram of the structure of a shift lever according to some embodiments of the present disclosure.

In some embodiments, an outer periphery of the shift lever 323 is provided with helical grooves 3231 extending along a length direction of the shift lever 323, as shown in FIG. 8.

In some embodiments, the helical grooves 3231 are rotated toward the outer side of the roller body 31.

In some embodiments of the present disclosure, when the shift lever 323 rotates, the material is conveyed toward the outside of the roller body 31 due to presence of the helical grooves 3231, and thus the amount of the material entering the roller body 31 through the gap between the shift lever 323 and the roller body 31 can be reduced.

FIG. 9 is a flowchart illustrating a process of a control method for a biomass fuel processing pellet mill according to some embodiments. As shown in FIG. 9, a process 900 includes the following steps.

In some embodiments, the process 900 may be executed by a processor. The processor may comprise one or more sub-processing devices (e.g., a single-core processing device or a multi-core processing device). Merely by way of example, the processor may include a central processing unit (CPU), an application-specific integrated circuit (ASIC), etc., or any combination thereof.

In 910, acquiring an inner diameter of the ring die and a diameter of the roller body.

In some embodiments, the inner diameter of the ring die 2 and the diameter of the roller body 31 are calibrated at a beginning of a design of the biomass fuel processing pellet mill, i.e., after the biomass fuel processing pellet mill is assembled and molded, the inner diameter of the ring die 2 and the diameter of the roller body 31 are already determined.

In 920, acquiring a gap between the ring die and the roller body.

The gap between the ring die 2 and the roller body 31 is the extrusion gap between the roller assembly 3 and the ring die 2 as described above.

The ring die 2 and the roller body 31 are not in complete contact, and there is a certain gap between the ring die 2 and the roller body 31. When the ring die 2 rotates, there is material between the ring die 2 and the roller body 31, and the friction among the material, the roller, and the ring die 2 is used to realize the rotation of the roller body 31 driven by the ring die 2. The gap between the ring die 2 and the roller body 31 may be adjusted due to the type of processed material and various physical and chemical parameters of processed material. When the gap is adjusted, an area and a position of the deformation-compression zone change accordingly.

In some embodiments, the gap between the ring die 2 and the roller body 31 may be adjusted by the adjustment component 6. Further description of the adjustment component 6 may be found in the relevant description above.

In some embodiments, the processor may obtain material information based on a memory; obtain temperatures of a plurality of points based on the plurality of temperature sensors deployed on the inner wall of the ring die 2; and dynamically regulate the gap between the ring die 2 and the roller body 31 based on the material information and the temperatures of the plurality of points.

The material information includes the material pellet size distribution and a material composition.

The material composition may reflect a combustion value, a density, and other physical and chemical property of material pellets. For example, the material composition may include a type of raw material (e.g., pine, straw), a material moisture content, a percentage of additives (e.g., the percentage of binder), and a material density.

For more on the material pellet size distribution, please see the description above.

The memory is a hardware component for storing data and programs, such as a mass memory, a removable memory, a read-only memory, etc., or any combination thereof. In some embodiments, the material information may be manually pre-entered and uploaded into the memory, and the processor retrieves it directly from the memory.

The points may be indicated by positions of the temperature sensors deployed on the inner wall of the ring die 2. In some embodiments, the points may be pre-set. For example, the plurality of points are equally spaced along the inner wall of the ring die 2. The temperatures of the plurality of points may be acquired by the plurality of temperature sensors deployed on the inner wall of the ring die 2.

In some embodiments, a pressure required for material extrusion correlates to the material pellet size distribution and the material composition, and the gap between the ring die 2 and the roller body 31 correlates to the pressure required for material extrusion. For example, the greater the material density or the greater a viscosity of the material composition, the greater the pressure required for material extrusion, and then the appropriately smaller should the gap between the ring die 2 and the roller body 31.

In some embodiments, the gap between the ring die 2 and the roller body 31 is also correlated to the temperatures of the plurality of points. Too high temperatures of the plurality of points may result in softening of the material, then the gap between the ring die 2 and the roller body 31 needs to be appropriately adjusted to be large to avoid the material from being excessively extruded. When the temperatures of the plurality of points are too low, it is necessary to appropriately decrease the gap between the ring die 2 and the roller body 31 to increase the pressure and help the material pellets to be molded.

In some embodiments of the present disclosure, by dynamically regulating the gap between the ring die 2 and the roller body 31, it is possible to automatically adapt to differences in the physical properties of different raw materials, while intelligently reducing the intensity of extrusion in accordance with the fluctuations in temperature to avoid overheating damage to the equipment.

In some embodiments, the processor may determine the gap between the ring die 2 and the roller body 31 based on the material information and the temperatures of the plurality of points through a roller distance model.

The roller distance model is a model used to determine the gap between the ring die 2 and the roller body 31. In some embodiments, the roller distance model is a machine learning model. For example, the roller distance model is Neural Networks (NN), etc.

In some embodiments, an input of the roller distance model may include the material information and the temperatures of the plurality of points, and an output of the roller distance model may be the gap between the ring die 2 and the roller body 31.

In some embodiments, the roller distance model may be obtained based on a large number of training samples with labels. The training samples may include sample material information and sample temperatures at a plurality of sample points, and the labels may include actual gaps corresponding to the training samples.

In some embodiments, the processor may select preferred historical data, use historical material information and historical temperatures of a plurality of historical points in the preferred historical data as a training sample, use the actual gap between the ring die 2 and the roller body 31 in the preferred historical data as a label corresponding to that training sample, and randomly select a plurality of preferred historical data to construct a plurality of training samples and labels. The preferred historical data may be manually marked, such as historical data corresponding to the time when an actual production efficiency is high, a quality of the pellets is up to standard, and the equipment is running stably evaluated manually.

In some embodiments, the processor may input the training samples into an initial roller distance model, update parameters of the initial roller distance model through training iterations until a trained initial roller distance model satisfies a preset training condition, and obtain the roller distance model. The preset training condition may be that a loss function is less than a threshold, the loss function converges, or the count of training iterations reaches a threshold. An iterative manner may include stochastic gradient descent, etc.

In some embodiments of the present disclosure, the roller distance model can accurately predict and dynamically adjust the gap between the ring die 2 and the roller body 31, thereby achieving efficient production of pellets, optimizing the quality of the pellet products, and comprehensively improving the production efficiency and economic benefits.

In some embodiments, the input of the roller distance model further includes predicted temperatures of the plurality of points.

The predicted temperature of a point is a predicted temperature sequence consisting of the predicted temperatures of the point at a plurality of future moments. The predicted temperatures of the plurality of points are the plurality of predicted temperature sequences corresponding to the plurality of points.

In some embodiments, the roller distance model may include a temperature prediction layer and a distance prediction layer.

The temperature prediction layer refers to a model layer structure used to determine the predicted temperatures of the plurality of points.

In some embodiments of the present disclosure, an input of the temperature prediction layer may include the material information, the temperatures of the plurality of points, and the temperature rise rates of the plurality of points, and an output of the temperature prediction layer may include the predicted temperatures of the plurality of points.

The temperature rise rate refers to a rise rate of the temperature of the point. In some embodiments, the temperature rise rate of a point may be obtained by a temperature sensor corresponding to the point. In some embodiments, the temperature prediction layer may be obtained based on a large number of first training samples with first labels. The first training samples may include the sample material information, temperatures of the plurality of sample points at a first sample moment, and sample temperature rise rates of the plurality of sample points, and first labels corresponding to the first training samples may be a plurality of temperature sequences corresponding to the plurality of sample points during a second sample time period. The first sample moment precedes the second sample time period, the second sample time period includes a plurality of second sample moments, and the temperature sequence corresponding to a sample point during the second sample time period include the temperatures of the sample point at the plurality of second sample moments. The first training samples and the first labels may be obtained based on the historical data.

The distance prediction layer refers to a model layer structure used to determine the gap between the ring die 2 and the roller body 31.

In some embodiments, an input of the distance prediction layer may include the material information, the temperatures of the plurality of points, the predicted temperatures of the plurality of points, and an output of the distance prediction layer may be the gap between the ring die 2 and the roller body 31.

In some embodiments, the distance prediction layer may be obtained based on a large number of second training samples with second labels. The second training samples may include the sample material information, the temperatures of the plurality of sample points at the first sample moment, and the plurality of temperature sequences corresponding to the plurality of sample points during the second sample time period, which may be obtained based on the first training samples and the first labels. The second labels corresponding to the second training samples may include the gaps between the ring die 2 and the roller body 31 corresponding to the second training samples.

In some embodiments, a training process of the temperature prediction layer and the distance prediction layer may be found in a training process of the roller distance model above, which is not mentioned again here.

In some embodiments, the processor may determine and adjust the extension length of the shift lever 323 based on the gap between the ring die 2 and the roller body 31, the material information, and the operating parameter of the negative pressure fan.

For example, the processor may determine the corresponding extension length of the shift lever 323 by querying a third preset table based on the gap between the ring die 2 and the roller body 31, the material information, and the operating parameter of the negative pressure fan. The third preset table may be constructed manually based on experimental data. The correspondence in the third preset table is that the larger the gap between the ring die 2 and the roller body 31, the larger the friction of the material, and the smaller the operating power of the negative pressure fan, the longer the extension length of the shift lever 323.

In some embodiments of the present disclosure, by adjusting the extending and retracting of the shift lever 323 according to the gap between the ring die 2 and the roller body 31, the operating power of the negative pressure fan, and the material information, it can avoid the problems of the die holes being clogged or the material not being able to be molded while ensuring even distribution of the material, as well as avoiding the shift lever 323 from extending when unnecessary, thereby reducing mechanical wear.

In 930, acquiring a real-time angular velocity of the roller body.

In some embodiments, the processor may obtain the real-time angular velocity of the roller body 31 based on an angular velocity sensor mounted on a rotating shaft of the roller body 31.

In 940, calculating a duration of the shift lever in a deformation-compression zone and a duration of the shift lever retracting into the roller body based on the inner diameter of the ring die, the diameter of the roller body, the gap between the ring die 2 and the roller body 31, and the real-time angular velocity of the roller body.

In some embodiments, the processor may calculate the duration of the shift lever in the deformation-compression zone and the duration of the shift lever retracting into the roller body according to Equation (I):

$$T1 = \frac{R_2^2 + H^2 - (R_2 - R_1)^2}{2R_1 H \omega}, T2 = \frac{2\pi - [R_2^2 + H^2 - (R_2 - R_1)^2]}{2R_1 H \omega}. \quad (I)$$

In Equation (I), T1 denotes the duration of the shift lever in the deformation-compression zone, T2 denotes the duration of the shift lever retracting into the roller body, $R_2$ denotes the inner diameter of the ring die, $R_1$ denotes the diameter of the roller body, H denotes the gap between the ring die and the roller body, and ω denotes the real-time angular velocity of the roller body.

The duration of the shift lever in the deformation-compression zone is a total time during which the shift lever is ready to begin retracting into the roller body after completing a work of blocking the flow of material in the deformation-compression zone from a time when it begins to extend outward from the roller body. The duration of the shift lever retracting into the roller body is a total time from a time when the shift lever starts to retract into the roller body to a time when the shift lever is ready to start extending outward from the roller body again.

In some embodiments, the processor may obtain the durations of extension or retraction of the shift lever 323 based on a timing sensor.

When it is monitored that the extension duration of the shift lever 323 reaches the duration of the shift lever 323 in the deformation-compression zone (i.e., after a real-time monitoring of the extension duration of the shift lever 323 reaching T1), the shift lever 323 are retracted into the roller body 31, at this time, it indicates that the shift lever 323 has completed the work of blocking the flow of material in the deformation-compression zone towards the feeding zone, that is, the shift lever 323 has rotated to outside the deformation-compression zone.

When it is monitored that the retraction duration of the shift lever 323 reaches the duration of the shift lever 323 retracting into the roller body 31 (i.e., after a real-time monitoring of the retraction duration of the shift lever 323 reaching T2), the shift lever 323 extends outward from the roller body 31, that is, the shift lever 323 has rotated into the deformation-compression zone.

In some embodiments of the present disclosure, by calculating the duration of the shift lever 323 in the deformation-compression zone, it can realize accurate control of extension time and retraction time of the shift lever 323, thereby accurately controlling the time of the shift lever 323 blocking flow of the material in the deformation-compression zone to the feeding zone, ensuring the accuracy of the blocking of the material in the deformation-compression zone, improving the efficiency and effect of granulation. Additionally, it can also reduce or avoid the risk of a decrease in the amount of material supplied from the feeding zone to the deformation-compression zone due to the excessive blocking of the shift lever 323, reduce or avoid the risk of a friction or a collision between the shift lever 323 and the inner wall of the ring die 2, and improve the operational efficiency and safety.

In some embodiments, the processor may calculate the rotational speed of the ring die according to Equation (II):

$$v = HC\rho^{n-1}\frac{\Delta E_n}{T}. \quad (II)$$

In Equation (II), v denotes the rotational speed of the ring die, ρ denotes a material density, H denotes the gap between the ring die and the roller body, C denotes a material moisture content, n denotes a power-law index with a value of 0.318, T denotes a material temperature, $\Delta E_n$ denotes a flow activation energy with a value of 42476.23.

In some embodiments, the material density p and the material moisture content C may be obtained from the material information pre-entered manually. The gap H between the roller body 31 and the ring die 2 may be determined by the roller distance model described above. The material temperature T may be represented by an average of temperatures of the plurality of points obtained based on the plurality of temperature sensors on the inner wall of the ring die 2. The power-law index n and the flow activation energy $\Delta E_n$ are determined by a non-Newtonian fluid viscosity model.

That is, the rotational speed of the ring die 2 is related to the material density, the gap between the ring die 2 and the roller body 31, the material moisture content, the material temperature, and the flow activation energy.

Under that the material moisture content, the material density, the flow activation energy, and the gap between the ring die 2 and the roller body 31 remain unchanged, when the material temperature rises, increasing the rotational speed of the ring die 2 causes the friction between the materials to further increase, which intensifies the rise of the material temperature. Therefore, when the material temperature rises, it is necessary to reduce the rotational speed of the ring die to reduce the friction between the materials.

Under that the material moisture content, the material density, the flow activation energy, and the temperature remain unchanged, when the gap between the ring die 2 and the roller body 31 increases, the pressure of the roller and the ring die 2 on the material decreases. To ensure the production efficiency and the continuity of the supply of material, it is necessary to increase the rotational speed of the ring die 2 to compensate for the effect of the pressure decrease on production.

Under that the material density, the gap between the roller body 31 and the ring die 2, the material temperature, and the flow activation energy remain unchanged, the greater the material moisture content, the greater the rotational speed of the ring die 2, so that the friction between the materials increases to increase the evaporation amount of water.

In some embodiments of the present disclosure, the rotational speed of the ring die is dynamically adjusted according to the production needs, parameter variations, and the requirements of the production quality, which can precisely adjust the operation process of the ring die, thereby effectively optimizing the production process and enhancing the production efficiency and product quality.

The above mentioned is only a better example of the present disclosure and is not a limitation of the present disclosure in any form. Although the present disclosure has been disclosed as a better example, it is not intended to limit the present disclosure, and any skilled person familiar with the present disclosure may, without departing from the scope of the present disclosure, make some changes or modifications to equivalent embodiments based on the technical contents disclosed above. Any technician familiar with the present disclosure may use the technical content of the above disclosure to make some changes or modifications to the equivalent embodiments within the scope of the technical program of the present disclosure. However, any simple modification, equivalent changes, and modifications to the above embodiments based on the technical substance of the present disclosure, without departing from the technical program of the present disclosure, still fall within the scope of the technical program of the present disclosure.

What is claimed is:

1. A biomass fuel processing pellet mill, comprising:
   a conditioner, a conveyor, and a pressing unit connected in series; wherein the pressing unit includes a pressing housing, a ring die, a roller assembly, and an adjustment component, and a negative pressure fan; wherein the ring die is disposed within the pressing housing;
   the roller assembly is arranged inside the ring die, and the roller assembly and the ring die form an extrusion gap;
   the roller assembly includes a roller body and shift lever components, wherein the shift lever components are located inside the roller body, the shift lever components periodically extend to agitate material as the ring die rotates, and an extension duration and a retraction duration of the shift lever components are controlled in real time based on an inner diameter of the ring die, a diameter of the roller body, a gap between the ring die and the roller body, and a real-time angular velocity of the roller body; and
   the adjustment component is connected to the roller assembly and configured to adjust the extrusion gap between the roller assembly and the ring die; and
   the negative pressure fan is mechanically connected to an interior of the pressing housing via a suction pipe, wherein the negative pressure fan is configured to generate a negative pressure driving force by extracting gas from the interior of the pressing housing to drive the material after pressing is completed to be discharged from die holes, and an operating parameter of the negative pressure fan is related to a material pellet size distribution and the extrusion gap.

2. The biomass fuel processing pellet mill of claim 1, wherein
   the roller assembly further includes a support frame; wherein the support frame is provided with a guide slot extending along a radial direction of the ring die; and
   the adjustment component includes a slider and an actuator; wherein a fixed end of the actuator is connected to the support frame, and a movable end of the actuator is connected to the slider; and the slider is engaged in the guide slot and movable in the guide slot, the slider is connected to the roller body, and the roller body is rotatable relative to the slider.

3. The biomass fuel processing pellet mill of claim 1, wherein each of the shift lever components includes a cage, a first driving unit, and shift levers; wherein
   the cage is connected to the roller body and coaxially arranged with the roller body; and
   a fixed end of the first driving unit is connected to the cage, a movable end of the first driving unit is connected to the shift levers, and the first driving unit drives the shift levers to move along a radial direction of the roller body so that the shift levers extend outward from or retract into the roller body.

4. The biomass fuel processing pellet mill of claim 3, wherein the first driving unit includes a driving disk, a plurality of first driving gears, and a plurality of driving rods; wherein
   the driving disk encircles around outer sides of the first driving gears, the driving disk meshes with the first driving gears, the driving rods are spaced apart from the driving disk along a circumferential direction of the roller body, and the driving rods mesh with the first driving gears;
   the driving rods are movable along the radial direction of the roller body to drive the shift levers to extend outward from or retract into the roller body; and
   the first driving gears correspond to the driving rods one by one, and the first driving gears are circumferentially spaced around the roller body.

5. The biomass fuel processing pellet mill of claim 4, further comprising a limit disk, limit slots, and limit blocks; wherein
   the limit disk is arranged opposite to the driving disk in a thickness direction of the cage;
   the limit disk is provided with the limit slots extending along the radial direction of the roller body; and
   the driving rods are provided with the limit blocks, and the limit blocks are engaged in the limit slots.

6. The biomass fuel processing pellet mill of claim 4, further comprising second driving units; wherein
   each of the second driving units includes a driving box, a second driving gear, and a plurality of driven gears; wherein
   the driving box is connected to the driving rod, the second driving gear is located inside the driving box, and the plurality of driven gears is spaced along the axial direction of the roller body;
   the second driving gear and the plurality of driven gears are connected via a transmission belt;
   the shift levers correspond to the plurality of driven gears one by one, and the plurality of driven gears drive the shift levers to rotate; and
   a count of the second driving units is equal to a count of the driving rods, the second driving units correspond to the driving rods one by one, and the shift levers on two adjacent driving boxes are staggered along the axial direction of the roller body.

7. The biomass fuel processing pellet mill of claim 3, wherein an outer periphery of each of the shift levers is provided with a helical groove extending along a length direction of the shift lever.

8. A control method for the biomass fuel processing pellet mill of claim 1, comprising:
   acquiring the inner diameter of the ring die and the diameter of the roller body;
   acquiring the gap between the ring die and the roller body;

acquiring the real-time angular velocity of the roller body;

calculating a duration of a shift lever in a deformation-compression zone and a duration of the shift lever retracting into the roller body based on the inner diameter of the ring die, the diameter of the roller body, the gap, and the real-time angular velocity;

obtaining material information based on a memory;

obtaining temperatures of a plurality of points based on a plurality of temperature sensors deployed on an inner wall of the ring die; and determining the gap between the ring die and the roller body based on the material information and the temperatures of the plurality of points through a roller distance model, the roller distance model being a machine learning model.

9. The control method of claim 8, wherein the duration of the shift lever in the deformation-compression zone and the duration of the shift lever retracting into the roller body are calculated using Formula I:

$$T1 = \frac{R_2^2 + H^2 - (R_2 - R_1)^2}{2R_1 H \omega}, T2 = \frac{2\pi - [R_2^2 + H^2 - (R_2 - R_1)^2]}{2R_1 H \omega}. \quad (I)$$

wherein T1 denotes the duration of the shift lever in the deformation-compression zone, T2 denotes the duration of the shift lever retracting into the roller body, $R_2$ denotes the inner diameter of the ring die, $R_1$ denotes the diameter of the roller body, H denotes the gap between the ring die and the roller body, and $\omega$ denotes the real-time angular velocity of the roller body.

10. The control method of claim 9, wherein a rotational speed of the ring die is calculated using Formula II:

$$v = HC\rho^{n-1} \frac{\Delta E_n}{T}, \quad (II)$$

wherein v denotes the rotational speed of the ring die, $\rho$ denotes a material density, H denotes the gap between the ring die and the roller body, C denotes a material moisture content, n denotes a power-law index with a value of 0.318, T denotes a material temperature, $\Delta E_n$ denotes a flow activation energy with a value of 42476.23.

11. The biomass fuel processing pellet mill of claim 1, further comprising:

a cooling assembly arranged on an outer wall of the ring die for cooling the ring die to avoid excessive pellet temperature from causing carbonization and subsequent fracture or cracking, wherein an operating parameter of the cooling assembly is dynamically adjusted based on a temperature of the ring die.

12. The control method of claim 8, further comprising:

determining and adjusting an extension length of the shift lever based on the gap between the ring die and the roller body, the material information, and an operating parameter of the negative pressure fan.

* * * * *